United States Patent Office 3,605,229
Patented Sept. 20, 1971

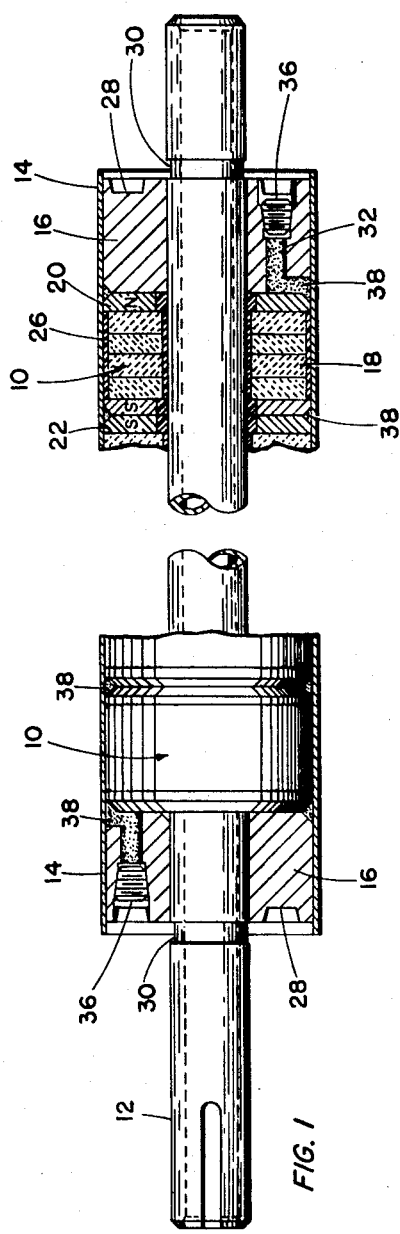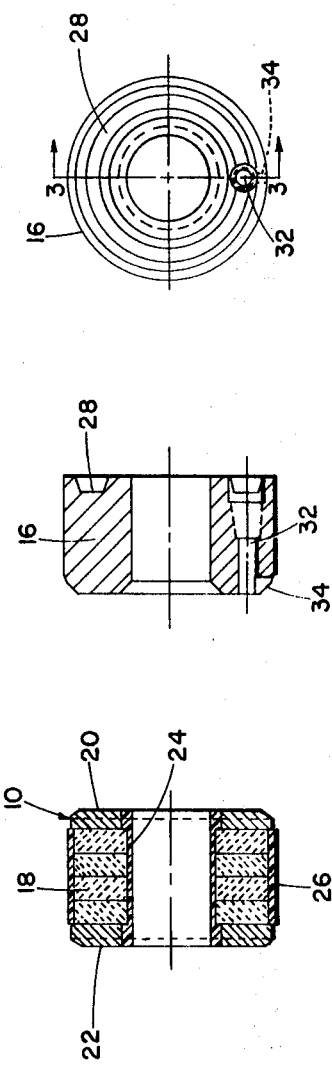

3,605,229
MAGNETIC ROLL STRUCTURE AND METHOD OF CONSTRUCTING SAME
James E. O'Neal, Cecil R. Attaway, and Josef K. Gunter, Durham, N.C., assignors to Gunter & Cooke, Inc., Durham, N.C.
Filed Feb. 19, 1970, Ser. No. 12,818
Int. Cl. B21b *31/08*
U.S. Cl. 29—125                     14 Claims

ABSTRACT OF THE DISCLOSURE

A magnetic roll structure incorporating permanent magnet modules disposed concentrically within a tubular shell and supporting the same solidly through a filling of hardened adhesive within the shell about each magnet module, the adhesive being characterized by low viscosity prior to hardening, by hardening without release of volatile products, and by insignificant shrinkage upon hardening.

BACKGROUND OF THE INVENTION

Magnetic roll structures of the general sort involved here are disclosed in prior U.S. Pats. No. 3,364,545 and No. 3,457,618 as arranged in particular for forming and loading a nip through the attractive force imposed by the magnetic field of permanent magnet modules disposed within a tubular shell. A problem encountered with such rolls is that of arranging the magnet modules firmly enough within the roll shell to prevent them from shifting during roll used and introducing an undesirable fatigue influence that tends to induce objectionable degradation of the roll surface. The second of the above-noted prior patents (No. 3,457,618) describes the use of deformable ring members between the magnet modules to chock them in place, and this arrangement makes an extremely firm roll assembly possible, but it has the disadvantage of localizing interior pressure on the roll shell through the deformable ring members and eventually tending to make the shell degradation problem worse than it was before. The present invention eliminates this disadvantage while providing a roll assembly of superior firmness.

SUMMARY OF THE INVENTION

Briefly described, the present invention is characterized by a filling of hardened adhesive within the tubular roll shell about each magnet module that provides a solid and rigid roll assembly in which the roll shell is supported by the magnet modues assembed therein rather than being employed to support the modules.

As in the previously noted prior patents, the magnet modules are provided in annular form, but are further fabricated according to the present invention with epoxy potting at their inner and outer diameters so as to form solid bodies fitting an axial roll shaft on which they are disposed concentrically within the roll shell. The roll shaft is positioned by closure members or bushings installed at the roll shell end portions in endwise clamping relation to the magnet modules disposed therebetween on the roll shaft. The space that then remains within the roll shell about the magnet modules is filled through access provision in the closure members with a hardenable adhesive to complete the roll structure in exceptionally advantageous form as is described further below.

DESCRIPTION OF THE DRAWINGS

FIG. 1 is a longitudinal section of a representative magnet roll structure embodying the present invention;
FIG. 2 is a sectional detail of the form of magnet module employed in the FIG. 1 roll structure;
FIG. 3 is a similar sectional detail of the closure member used at the ends of the FIG. 1 roll structure; and
FIG. 4 is a left side elevation corresponding to FIG. 3.

DESCRIPTION OF THE PREFERRED EMBODIMENT

The roll structure embodying the present invention that is illustrated in FIG. 1 incorporates a plurality of permanent magnet modules, as indicated generally by the reference numeral 10, which are carried by an axial shaft 12 concentrically within a tubular shell 14, the axial shaft 12 extending through closure members or bushings 16 at each end of the tubular shell 14 to provide journal portions at each end of the roll structure and being secured by these closure members 16 in axial relation to the tubular shell 14.

It is preferred that the axial shaft 12, the tubular shell 14, and the closure members 16, all be formed of a nonmagnetic material so that the magnet modules 10 are not required to saturate the roll structure. A 300 series stainless steel is satisfactory for this purpose, although the tubular shell 14 must then be provided with an exterior coating of a non-magnetic hard surfacing material, as described at length in the previously noted U.S. Pat. No. 3,364,545, so that an adequately hard shell surface is presented for serviceable use of the roll structure.

When the roll structure is thus of non-magnetic character otherwise, the permanent magnet modules 10 may be of any type having sufficient persistence to eliminate the need for a keeper. Although special Alnico magnets are available with this property, permanent magnets of the ceramic type exhibit it characteristically and are preferred.

The permanent magnet module 10 of the ceramic type employed in the illustrated FIG. 1 embodiment is shown at FIG. 2 in enlarged detail as comprising a plurality of ceramic magnet wafers 18 assembled between a pair of pole pieces 20 and 22. The magnet wafers 18 are of the sort described by U.S. Pat. No. 2,980,617. They consist of a mixture of iron oxide and the oxide of a bivalent metal that has been sintered and then oriented and compacted in a magnetic field. A common and preferred mixture employed for this purpose has the empirical formula $BaO.6Fe_2O_3$.

The magnet wafers 18 and pole pieces 20 and 22 are provided in annular form so that the module assembly 10 may be disposed on the axial shaft 12 in concentric relation within the tubular shell 14. The illustrated module 10 employs four magnet wafers 18 assembled between the pole pieces 20 and 22, the assembly being effected with a suitable epoxy or acrylic adhesive. Axially oriented magnet wafers 18 are used, so that the modules 10 may subsequently be magnetized axially in preparation for use, and both the inner and outer diameters of the pole pieces 20 and 22 are made sufficiently greater than that of the wafers 18 to avoid establishment of any inwardly reaching magnetic field and to define the outer diameter of the modules 10 in relation to the pole pieces 20 and 22 which may be machined readily.

The magnetic modules 10 are completed by potting them inwardly and outwardly as indicated at 24 and 26. The potting material used should be capable of adhering tenaciously to the module surfaces covered and of forming tough and relatively hard coverings. A thermosetting epoxy composition containing a glass fiber filler is preferred for this purpose. The inner potted covering 24 is proportioned to form a module bore fitting the axial shaft 12 closely for establishing and maintaining the concentric disposition of the modules 10 within the tubular shell 14, while the outer potted covering is arranged over the magnet wafers 18 to at least the outer level of the pole pieces 20 and 22 to form the module body with an outer diameter fitting the inner diameter of the tubular shell 14 as nearly as possible. Exact fitting with the tubular shell 14 is not a practical possibility because welded tubing from which the shell is most reasonably made always exhibits some degree of ovality. In preparing the shell 14 for use according to the present invention it is honed interiorly until a module 10 can be passed therethrough without undue resistance, but even such honing will not eliminate the ovality entirely.

With the several roll components prepared in the above-described form, construction of the roll structure begins with securing one of the closure members 16, preferably the one to the right as seen in FIG. 1, preliminarily to the axial shaft 12. This is done by tack welding, the closure members 16 being annularly grooved at 28 and the shaft 12 being undercut at 30 to facilitate this and the subsequent welding that must be done. After the first closure member 16 is preliminarily secured in place, the shaft 12 is positioned vertically in a loading fixture and the tubular shell 15 is placed over it and the secured closure member 16 in proper relation as determined by the fixture.

Then the magnet modules 10 to be incorporated in the roll structure are magnetized axially and stacked for loading with the polarity of adjacent modules reversed (i.e., like pole pieces of adjacent modules positioned adjacently). The loading is commenced by placing a thin coat of adhesive (i.e., approximately .002" thick) on the top face of the top module 10 in the stack and then inverting and dropping it over the shaft 12 and within tubular shell 14. This procedure is repeated until all of the modules 10 have been loaded, with such tamping at each step as is needed to position the loaded modules in successive contact.

When all the modules 10 are in place, the other closure member 16 is installed and subjected to an endwise loading in the order of 10,000 pounds to clamp the loaded modules 10 between the closure members 16 sufficiently to insure closing the space between the adjacent module pole pieces, and then this other closure member is tack welded in place so that the endwise loading can be released to allow removal of the roll structure from the fixture and complete welding of the closure members to both the axial shaft 12 and the tubular shell 14.

At this stage, assembly of the roll structure is complete except for filling the voids that remain within the tubular shell 14 about the magnet modules 10 by reason of the previously mentioned ovality. Filling of these voids is accomplished according to the present invention by pumping an adhesive into the roll structure. For this purpose, each of the closure members 16 is formed with an access channel 32 extending parallel to the roll axis from a counterboard portion of the outer face annular groove in each closure member 16 to its inner face at which a lateral slot 34 opens toward the inner surface of the tubular shell 14.

In the completed roll structure these access channels 32 may be left with the hardened adhesive exposed thereat or they may be optionally closed by pipe plugs 36, as seen in FIG. 1, but for the adhesive filling operation grease fittings (not shown) are installed in both closure members 16 at the access channels 32 and, with the roll structure positioned vertically, adhesive is pumped through the lower grease fitting while the check ball in the upper fitting is held open until adhesive issues therethrough.

The adhesive employed for the filling must have a relatively low viscosity prior to hardening (i.e., in the order of 400 cps. Brookfield), it must harden without releasing any volatile products, and upon hardening the shrinkage must be insignificant and the lap shear strength developed must be approximately 2000 p.s.i. An adhesive meeting these requirements and serving effectively as a filling material is the acrylic adhesive No. TS–542 available from Hughson Chemical Company of Erie, Pa. This adhesive is used in admixture with a curing catalyst so that it hardens to an infusible form and has good compatability with the potting material carried by the magnet modules 10 at 26, as well as maintaining good bond strength at the relatively large voids formed within the tubular shell 14 between the chamfers at the outer face peripheries of the module pole pieces 20 and 22. The chamfers of each of the pole pieces 20 and 22 of the magnet module 10 are required in order to form a circumferential channel into which adhesive will flow and thus insure that the majority of the air in the voids between the magnet modules 10 and the tubular shell 14 of the vertically positioned roll structure is displaced by the rising adhesive. The absence of these channels could result in adhesive flowing directly from the lateral slot 34 in the lower closure member 16 to the corresponding lateral slot 34 in the upper closure member 16 thereby bypassing a majority of the void spaces between the magnet modules 10 and the tubular shell 14.

By filling the roll structure with this adhesive in the previously noted fashion, substantially all air within the tubular shell 14 is displaced as the adhesive rises and finally overflows through the upper grease fitting that has been held open to allow such displacement and overflow. As soon as the overflow appears the upper grease fitting is released to a closed position. About half an hour is allowed for initial hardening before both of the grease fittings are removed, and then the roll structure allowed to stand for about 24 hours longer to permit full curing of the adhesive before installing the optional pipe plugs 36 and proceeding with final grinding to finish the roll structure for use.

The adhesive filling is indicated by the stippling in FIG. 1 at 38. It is not possible to indicate the full extent of the filling in this manner because the adhesive-filled voids principally left about the magnet modules 10 by reason of ovality in the tubular shell 14 are relatively too small for illustration. Actually, the shell ovality should be held within a manufacturing tolerance of .024" T.I.R. (total indicator runout), but even this relatively small degree of ovality leaves voids capable of producing critical stress areas in the roll surface during use, and it is the adhesive filling provided according to the present invention that obviates degradation of the roll surface through such stressing and allows construction of a roll structure that is adequately sound and serviceable.

The present invention has been described in detail above for purposes of illustration only and is not intended to be limited by this description or otherwise to exclude any variation or equivalent form or procedure that would be apparent from, or reasonably suggested by, the foregoing disclosure to the skill of the art.

We claim:

1. A magnetic roll structure comprising a tubular shell, at least one permanent magnet module disposed concentrically within said tubular shell, and a filling of hardened and infusible adhesive within said tubular shell about each such magnet module.

2. A magnetic roll structure as defined in claim 1 and further characterized in that other than such magnet modules said roll structure is formed entirely of non-magnetic materials, and in that each such magnet module has sufficient persistence to eliminate the need for a keeper.

3. A magnetic roll structure as defined in claim 2 and further characterized in that each such magnet module is annular in form and includes a plurality of ceramic magnet wafers assembled between pole pieces, and in that said wafers are axially oriented and magnetized.

4. A magnet roll structure as defined in claim 1 and further characterized in that said adhesive filling is formed of a catalytically cured acrylic material.

5. A magnetic roll structure as defined in claim 1 and further characterized in that closure members are secured within the end portions of said tubular shell, in that a shaft extends through said tubular shell and beyond said closure members to provide journal portions at each end of the roll structure and is secured by said closure members in axial relation to said tubular shell, and in that each such magnet module is carried by said shaft within said tubular shell and between said closure members.

6. A magnetic roll structure as defined in claim 5 and further characterized in that a plurality of said magnet modules are carried by said shaft with like pole pieces of adjacent magnet modules positioned adjacently and with said adjacent pole pieces clamped in contact between said closure members.

7. A magnetic roll structure as defined in claim 5 and further characterized in that each such magnet module is annular in form and is potted for fitting said shaft so as to be carried thereby concentrically within said tubular shell.

8. A magnetic roll structure as defined in claim 7 and further characterized in that the potting material applied to each such magnet module is a thermoset epoxy composition containing a glass fiber filler.

9. The method of constructing a magnetic roll structure which comprises disposing at least one permanent magnet module concentrically within a tubular shell, filling all voids within said tubular shell about each such magnet module with an adhesive capable of hardening to an infusible form, and allowing the adhesive filling to harden.

10. The method of constructing a magnetic roll structure as defined in claim 9 and further characterized in that the adhesive employed for filling said voids is an acrylic material having a curing catalyst admixed therewith, and in that the hardening allowed to occur takes place by catalytic curing.

11. The method of constructing a magnetic roll structure as defined in claim 9 and further characterized in that a plurality of said magnet modules are disposed serially and concentrically within said tubular shell with like pole pieces of adjacent magnet modules positioned adjacently, and in that said magnet module series is clamped endwise with sufficient force to insure closing the space between the adjacent pole pieces within said tubular shell prior to said void filling with adhesive.

12. The method of constructing a magnetic roll structure as defined in claim 9 and further characterized in that each such magnet module is formed annularly and is potted axially for concentric location upon disposition within said tubular shell.

13. The method of constructing a magnetic roll structure as defined in claim 12 and further characterized in that the potting material applied to each such magnet module is a thermosetting epoxy composition containing a glass fiber filler.

14. The method of constructing a magnetic roll structure as defined in claim 9 and further characterized in that each such magnet module is maintained concentrically disposed within said tubular shell by supporting the latter at its end portions in relation to the former prior to said void filling with adhesive.

References Cited

UNITED STATES PATENTS

| | | | |
|---|---|---|---|
| 2,063,608 | 12/1936 | Lade | 29—125X |
| 3,150,419 | 9/1964 | Aurich. | |
| 3,364,545 | 1/1968 | O'Neal et al. | 29—125 |
| 3,457,618 | 7/1969 | O'Neal et al. | 29—125 |

FOREIGN PATENTS

| | | | |
|---|---|---|---|
| 232,953 | 4/1964 | Austria | 100—Dig17 |

ALFRED R. GUEST, Primary Examiner

U.S. Cl. X.R.

29—148.4